Figure 1:
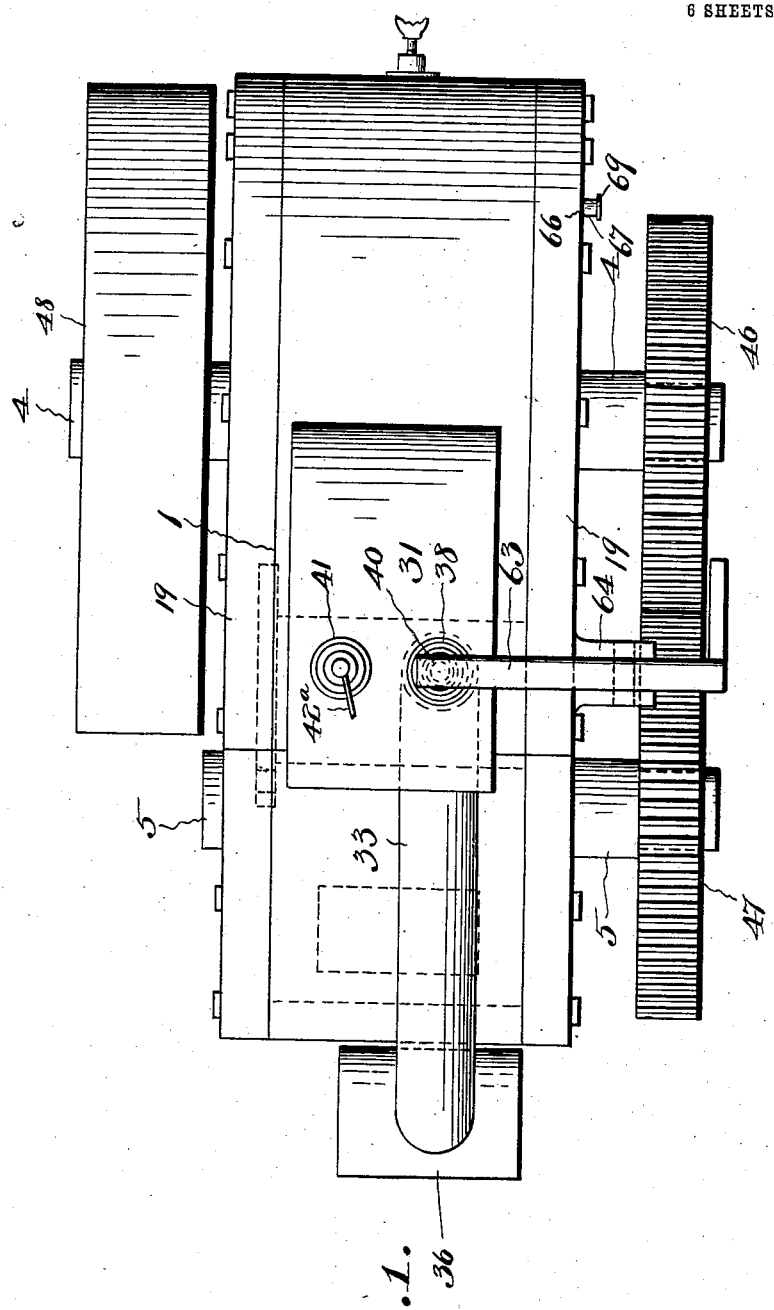

J. C. KING.
ROTARY ENGINE.
APPLICATION FILED FEB. 25, 1911.

1,024,787.

Patented Apr. 30, 1912.
6 SHEETS—SHEET 1.

WITNESSES
INVENTOR:
Jesse C. King
by James K. Polk
Attorney

J. C. KING.
ROTARY ENGINE.
APPLICATION FILED FEB. 25, 1911.
1,024,787.
Patented Apr. 30, 1912.
6 SHEETS—SHEET 2.
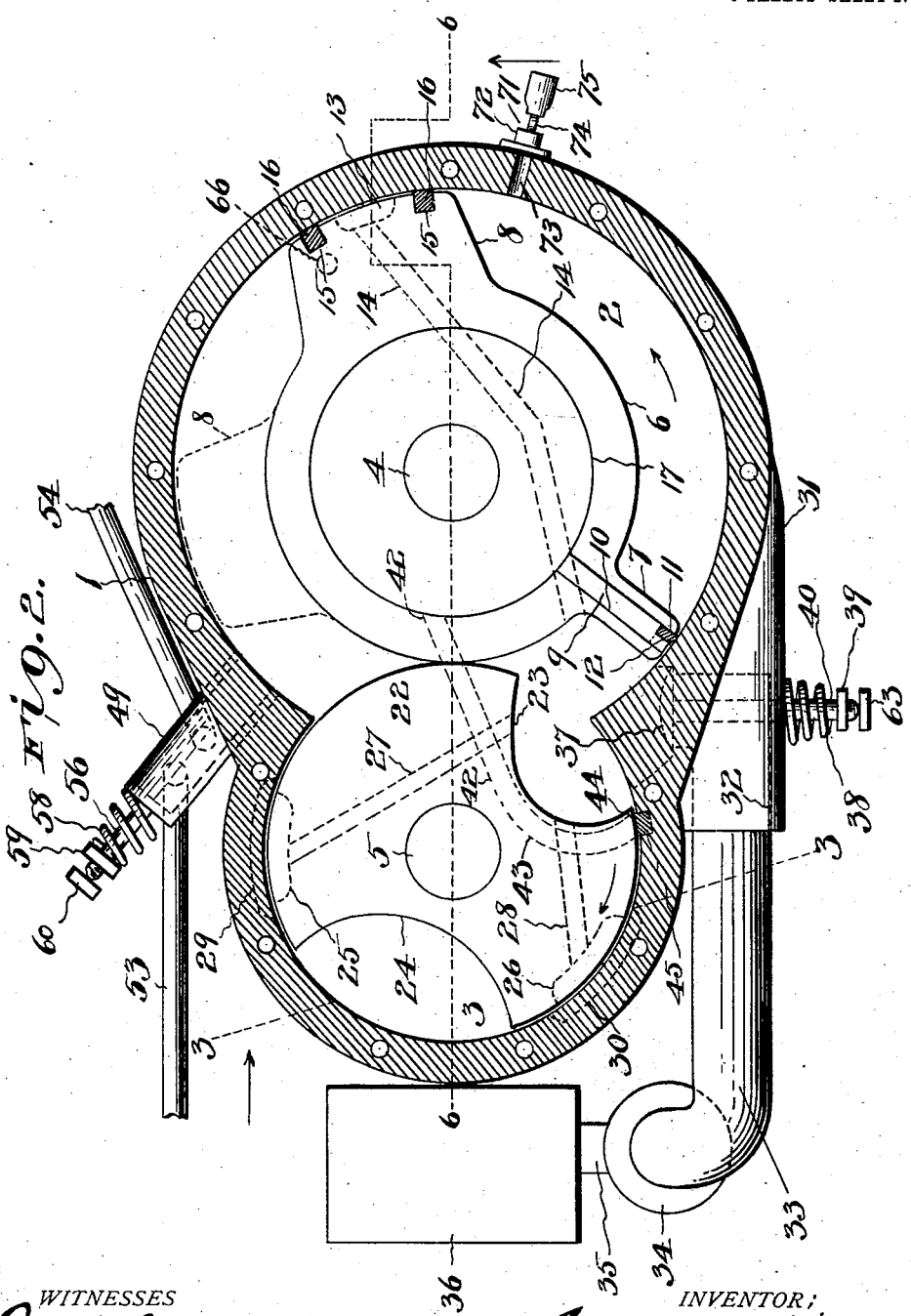

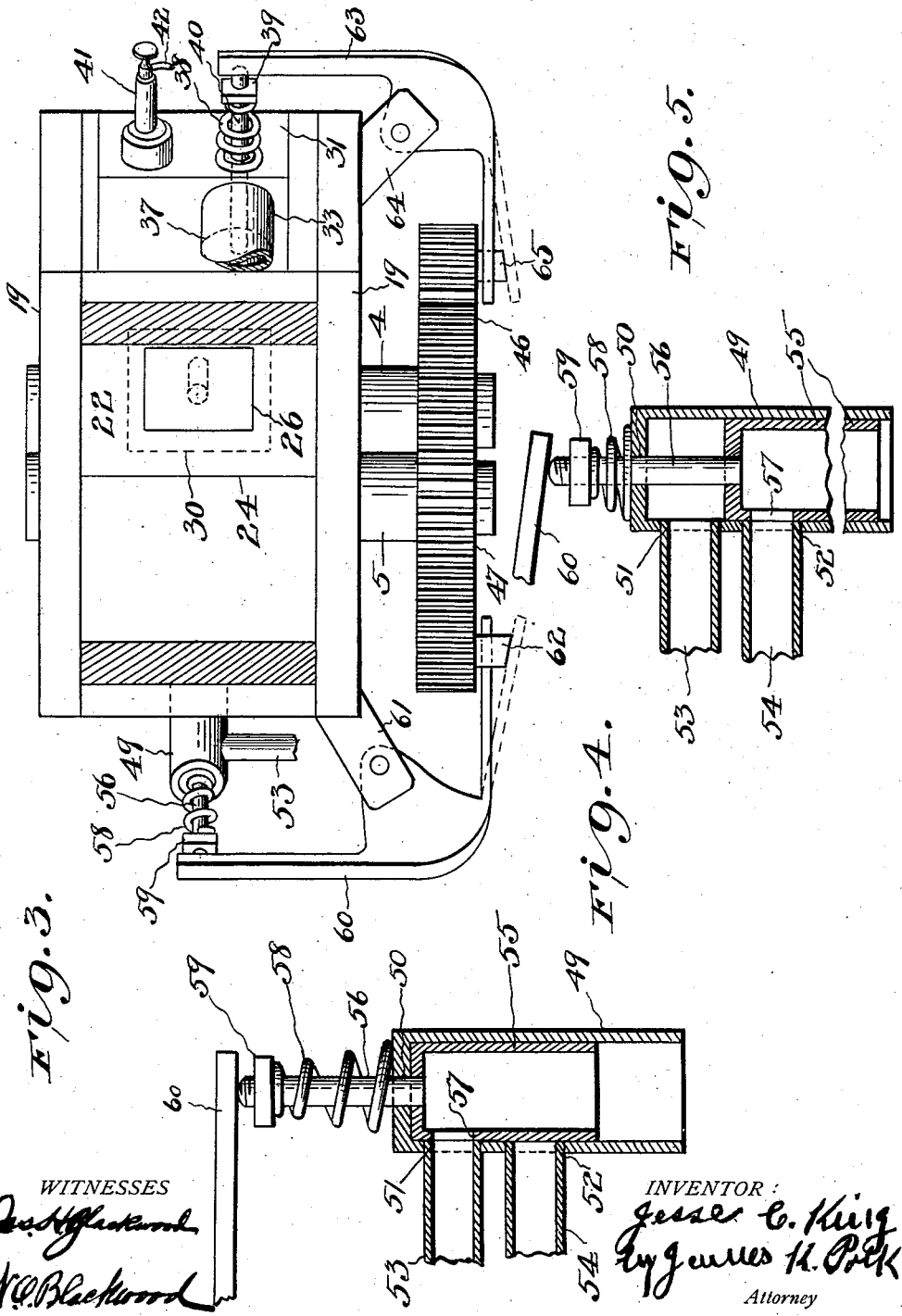

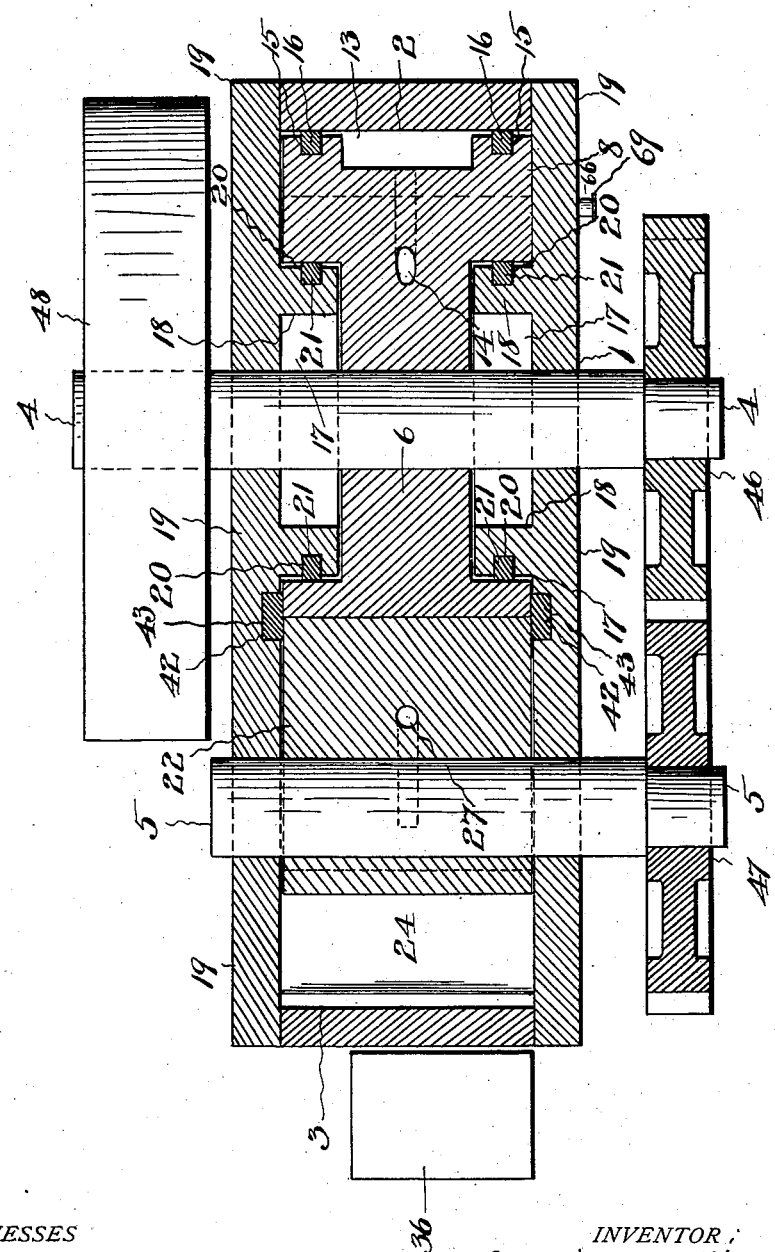

J. C. KING.
ROTARY ENGINE.
APPLICATION FILED FEB. 25, 1911.
1,024,787.
Patented Apr. 30, 1912.
6 SHEETS—SHEET 5.
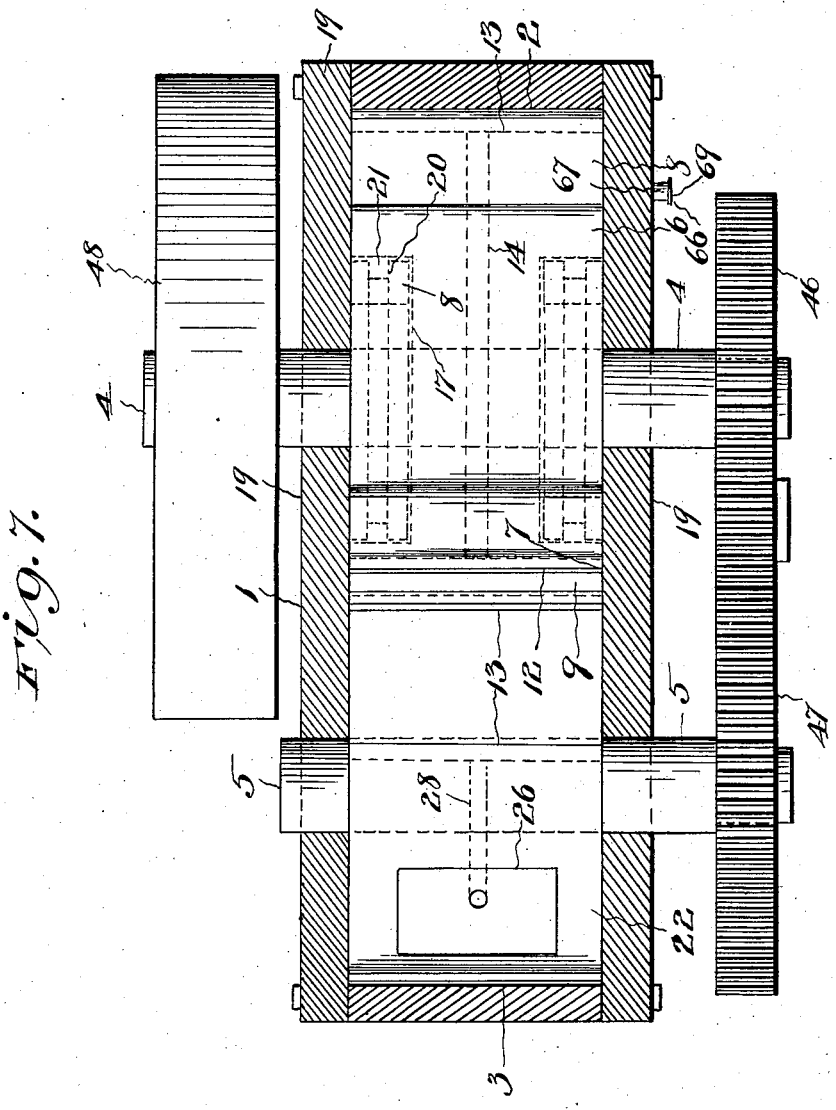
WITNESSES
INVENTOR:
Jesse C. King
by James K. Polk
Attorney

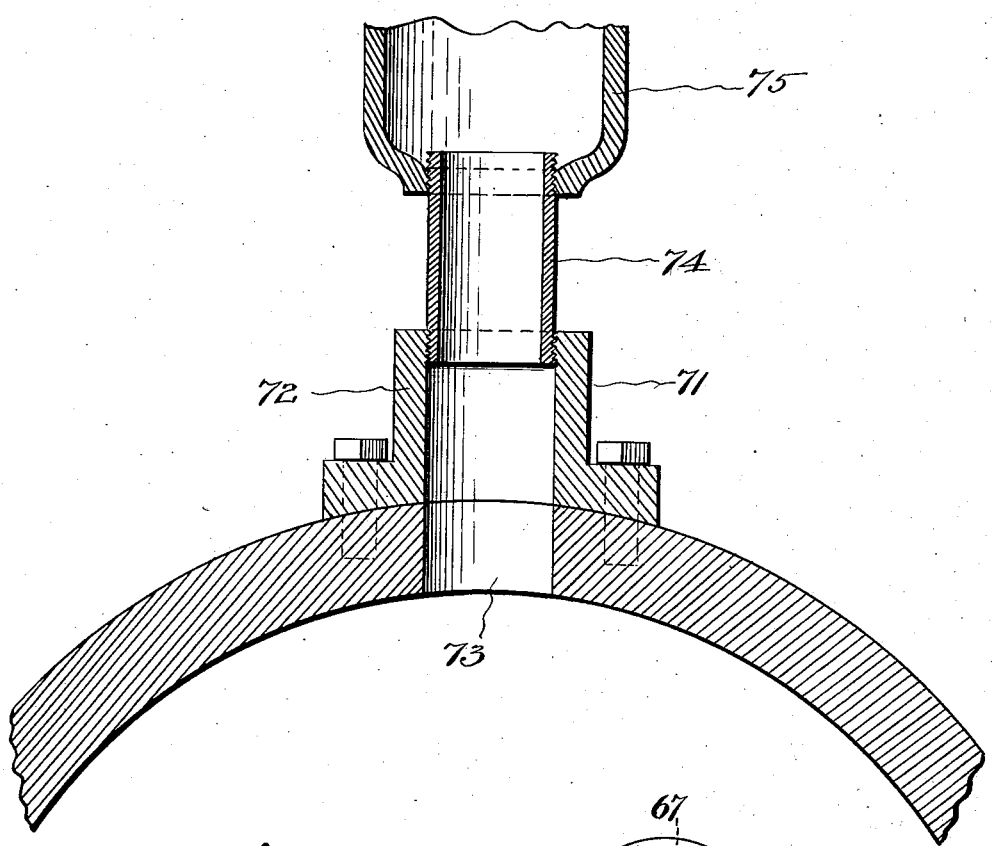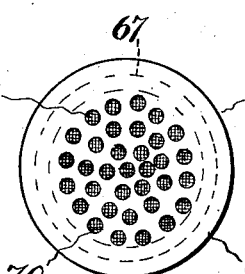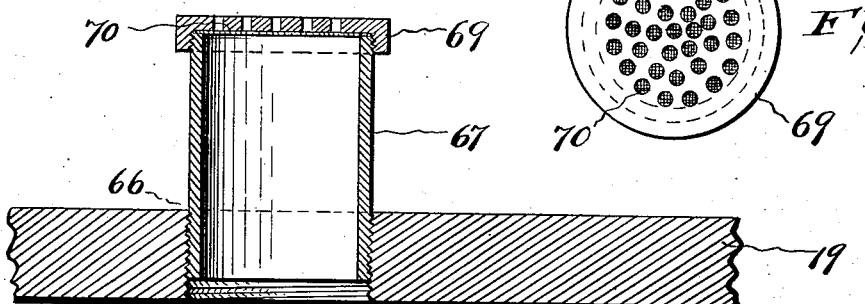

UNITED STATES PATENT OFFICE.

JESSE C. KING, OF LA JUNTA, COLORADO, ASSIGNOR OF ONE-THIRD TO WILLIAM H. BIEBES, OF LA JUNTA, COLORADO.

ROTARY ENGINE.

1,024,787. Specification of Letters Patent. Patented Apr. 30, 1912.

Application filed February 25, 1911. Serial No. 610,725.

*To all whom it may concern:*

Be it known that I, JESSE C. KING, a citizen of the United States, and a resident of La Junta, in the county of Otero and State of Colorado, have invented certain new and useful Improvements in Rotary Explosive-Engines, of which the following is a specification.

My invention relates to rotary explosive engines, and has for its object the provision of an engine having two parallel shafts geared together and two intermeshing pistons mounted in the shafts, one piston having two radial lugs or vanes extending from its periphery, while the periphery of the other piston is formed with recesses that receive the lugs during rotation of the pistons. By this construction the engine produces an even and regular stroke.

Another object of my invention is the provision of pressure relief chambers in the pistons remote from the explosion-chamber, formed during each revolution of the pistons, said pressure relief chambers being connected with the explosive-chamber by ducts extended through the pistons, so that the force of each explosion is distributed to different parts of the engine-casing to prevent undue strain on the part of the casing immediately adjacent to the explosion-chamber.

Another object of my invention is the provision of an improved two-way valve by which when the piston of the valve is in one position the engine-chamber is in communication with the exhaust, while when in the other position the engine-chamber is in communication with a compressed-air tank for supplying the carbureter.

Other objects of my invention will appear in the particular description of the engine hereinafter, and will be found illustrated in the accompanying drawings, in which—

Figure 1 is a view in elevation of the engine on the side toward the inlet-valve for the explosive mixture; Fig. 2, a view showing the casing in section and the pistons in plan; Fig. 3, a view, partly in section, on the line 3 3 of Fig. 2, looking in the direction of the arrow; Figs. 4 and 5, detail sectional views of the two-way valve showing the piston in its two positions; Fig. 6, a sectional view on the line 6 6 of Fig. 2, looking in the direction of the arrow; Fig. 7, a sectional view of the casing with the pistons shown in elevation; Fig. 8, a sectional detail view of the exhaust and muffler; Fig. 9, a sectional view of the air-inlet; and Fig. 10, a top plan view of the air inlet.

In the accompanying drawings similar reference characters indicate corresponding parts throughout all of the views.

The barrel 1 of the casing of my improved engine is formed with two communicating cylindrical chambers 2 and 3, with the shafts 4 and 5 journaled centrally thereof.

6 indicates a piston secured to the shaft 4 and having radial lugs 7 and 8 extending from its periphery, lug 7 being relatively narrower than lug 8 and forming the driving-vane of the piston.

9 indicates a friction-plate removably and replaceably mounted in a recess 10, extending radially of the lug and piston, and 11 a packing-strip mounted in a recess 12 in the outer edge of plate 9.

Lug 8 is formed with a chamber 13 in its outer face that is connected by means of a duct 14, extending across the piston 6, with the surface of the piston immediately in the rear of the lug 7, and the face of the lug is also formed with a recess 15 at each side of the chamber 13, in which are mounted packing-strips 16. The ends of the piston 6 are formed with cylindrical recesses 17, adjacent to the shaft 4, to receive annular flanges 18 on the inner sides of the end plates 19 of the casing, said flanges being formed with circumferential recesses 20, in which are mounted packing rings 21.

22 indicates a piston secured to shaft 5 and having its periphery formed with recesses 23 and 24 to receive pistons 7 and 8, respectively, when the engine is in operation, the periphery of the piston 22 being formed with pressure relief chambers 25 and 26 that communicate with recess 23 by means of ducts 27 and 28, respectively.

The object of chambers 25, 26 and 13 and their communicating ducts is to receive some of the products of the explosions during the operation of the engine to distribute the force of the explosions and relieve the lug 7 and recess 23 and the faces of pistons 6 and 22, adjacent to the said lug and recess, as well as the casing adjacent to said parts, of some of the force of the explosions, it being understood that when the engine is in the position shown in Fig. 2 the parts are in position for an explosion in the chamber formed by lugs 7 recess 23 and the adjacent parts of the pistons and casing, and when the charge therein is exploded piston 6 is driven by the effect of the explosion on lug 7. After the first effect of the explosion is passed the compressed gases in the chambers 13, 25 and 26, and their connected ducts, expand and the expanding gases serve to continue the pressure on the lug 7, the action of the gases in chambers 25 and 26 and ducts 27 and 28, however, ceasing when the piston 22 has rotated sufficiently so that recess 23 is inclosed by the casing 1, surrounding chamber 3.

29 and 30 indicate packing set into casing 1 in the position shown in Fig. 2 to hermetically seal the edges of chambers 25 and 26, respectively, when the explosion takes place, as hereinbefore stated.

31 indicates an offset on casing 1 and 32 a passage therein and in casing 1, communicating with the interior of the casing, said passage 32 being connected by means of a pipe 33 with a carbureter 34, and said carbureter being in turn connected by means of a pipe 35 with a compressed-air tank 36.

37 indicates a valve in passage 32 that is normally held in a closed position by means of a spring 38, engaging offset 31 and a tension-nut 39, mounted on the threaded stem 40 of the valve.

41 indicates the spark-plug that is connected by means of wire 41$^a$ with any preferred form of generator and a timer (not shown) so arranged that when the explosive mixture has been admitted to the casing and the valve 37 has closed the mixture is fired.

42 indicates packing-strips inserted in grooves 43 in plates 19, and 44 a packing-strip mounted in a groove 45 in barrel 1 and connecting the ends of strips 42, said strips being so arranged, as shown in Fig. 2, as to make the spaces around pistons 6 and 22 and the barrel 1 and plates 19 gas-tight.

46 and 47 indicate intermeshing pinions secured to shafts 4 and 5, respectively, and 48 a balance or fly wheel secured to shaft 4.

49 indicates a valve-casing formed tubular, as shown, with its outer end closed except for a central orifice 50, while its inner end communicates with chamber 2 of the engine-casing. Valve-casing 49 has two orifices 51 and 52 in its side wall, one of which 51 is connected by means of pipe 53 with air-tank 36, while the other orifice 52 has exhaust-pipe 54 secured therein. The valve-piston mounted in casing 49 consists, as shown in Figs. 4 and 5, of a tube 55, open at the end toward the engine-casing, and closed at its other end, and having a stem 56 secured to its closed end, that is mounted in orifice 50. Said valve-piston is provided with an opening 57 in its side wall that communicates with one or the other orifices 51 or 52 in the two positions of the valve, as shown in said Figs. 4 and 5. The valve-piston is held normally in its outermost position, as shown in Fig. 4, by means of a coil-spring 58, engaging the end of casing 49, and a tension-nut 59, mounted on the threaded end of the stem 56.

60 indicates a lever pivotally mounted on ears 61, projecting from plate 19, one arm of said lever engaging the end of valve-stem 56, while its other end is positioned to engage a cam 62 on gear-wheel 47, said cam 62 being so positioned on the gear-wheel that the valve-piston 55 is moved inwardly, so as to close the orifice 51 and bring opening 57 therein into alinement with orifice 52, when the lug 8 is approaching the entrance to valve-casing 49, and it is so held until the lug has passed the entrance to casing 49. During the passage of the lug 8 by the casing 49 the explosive charge in the engine-casing is exhausted through duct 14 and expansion-chamber 13, while said expansion-chamber is alined with the casing-entrance. After lug 8 has passed the entrance to the valve-casing the lever 60 is released by the cam 62 and the spring 58 moves the valve outwardly.

While in its outermost position the rotation of the pistons 6 and 22 causes the air in advance of lugs 7 and 8 to be forced through pipe 53 to air-tank 36, a suitable air-inlet valve 66 being provided to admit air to the interior of the casing to be compressed, as stated, said air-inlet valve consisting of a tubular extension 67, secured in an opening 68 in one of the plates 19, and covered by a perforated cap 69, behind which is mounted a fine wire mesh screen 70 to act as a filter for the air entering the cylinder. The inlet-valve 37 is opened by a lever 63, pivotally mounted on ears 64, extending outwardly from plate 19, one arm of the lever 63 engaging the end of valve-stem 40, while the other end is periodically engaged by cam 65 or gear-wheel 46, said cam being so positioned as to open the valve 37 when the pistons 6 and 22 are in the proper position to receive the explosive charge, the valve being closed as soon as the cam passes from engagement with the lever.

71 indicates an exhaust consisting of a nipple 72, secured to casing 1 and communicating with an opening 73 in the casing, 74 indicating a tube secured in the end of nipple 72 and connected with a nipple 75 of any desired form. The purpose of this exhaust is to act in conjunction with the exhaust 54 to rid the cylinder of the burned gases behind the lug 7.

Having thus described my invention, what I claim is—

1. In a rotary engine, a duplex casing comprising two communicating cylinders, a piston mounted in each cylinder, one of said pistons having lugs extending from its periphery, the other piston formed with recesses to receive the lugs on the first-mentioned piston, one of said lugs formed with an expansion-chamber in its outer face, said lug and piston formed with a duct extending from said expansion-chamber to the rear of the other lug, substantially as shown and described.

2. In a rotary engine, a duplex casing comprising two communicating cylinders, a piston mounted in each cylinder, one of said pistons having lugs extending from its periphery, the other piston formed with recesses to receive the lugs on the first-mentioned piston, the last-mentioned piston formed with expansion-chambers in its periphery and ducts extending from said chambers to one of the recesses aforesaid, substantially as shown and described.

3. In a rotary engine, a duplex casing comprising two communicating cylinders, a piston mounted in each cylinder, one of said pistons having lugs extending from its periphery, the other piston formed with recesses to receive the lugs on the first-mentioned piston, one of said lugs formed with an expansion-chamber in its outer face, said lug and the piston provided with a duct connecting said chamber with the rear of the other lug, the recessed piston also formed with expansion-chambers in its periphery and ducts connecting said chambers with the recesses formed to receive the last-mentioned lug on the other piston, substantially as shown and described.

4. In a rotary engine, a duplex casing comprising two communicating cylinders, a piston mounted in one cylinder having two lugs on its periphery, one of said lugs being relatively wider than the other, the wider lug having an expansion-chamber formed in its outer face and the lug and piston provided with a duct extending from said expansion-chamber to the rear side of the narrower lug, the other piston formed with recesses in its periphery to receive the lugs on the first-mentioned piston, the recess to receive the narrower lug being smaller than the other recess, said recessed piston formed with expansion-chambers in its periphery, and ducts connecting said chambers and the smaller recess, substantially as shown and described.

In witness whereof, I have hereunto set my hand in presence of two subscribing witnesses.

JESSE C. KING.

Witnesses:
HENRY W. ALLEN,
WILLIAM H. BIEBES.

Copies of this patent may be obtained for five cents each, by addressing the "Commissioner of Patents, Washington, D. C."